Sept. 25, 1928.                     1,685,454
C. JOHNSON
TESTING DEVICE FOR VALVES
Filed June 1, 1926
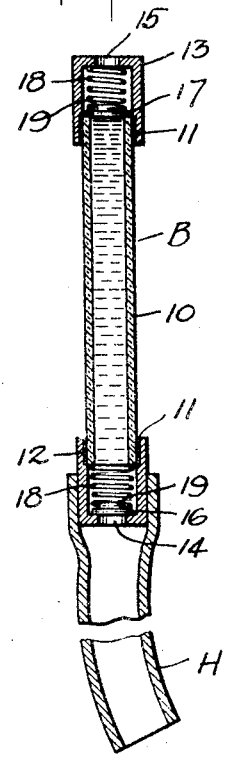
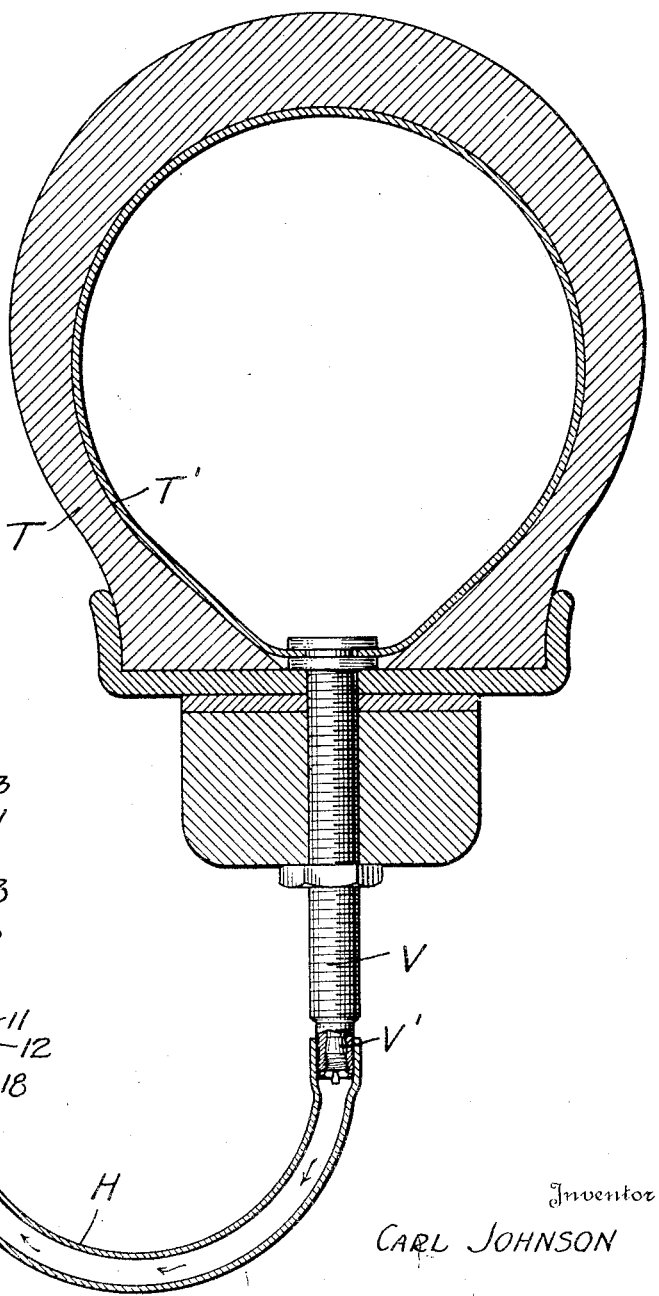
Inventor
CARL JOHNSON
By Munn & Co.
Attorney Patented Sept. 25, 1928.

1,685,454

UNITED STATES PATENT OFFICE.

CARL JOHNSON, OF LOS ANGELES, CALIFORNIA.

TESTING DEVICE FOR VALVES.

Application filed June 1, 1926. Serial No. 113,090.

My invention relates generally to devices for testing valves and more particularly to a device by which a tire valve can be quickly tested to determine whether or not it leaks, the device displacing the present method in vogue of applying saliva to the valve stem for this purpose.

A purpose of my invention is the provision of a device of the above described character which preferably embodies the use of a body of liquid into which air escaping from the tire valve is caused to pass in the form of bubbles to thus visibly indicate a leak in the valve.

I will describe only one form of testing device embodying my invention and will then point out the novel features thereof in claims.

In the accompanying drawings,

Figure 1 is a view in longitudinal vertical section of one form of testing device embodying my invention applied to the valve stem of a tire and indicating the presence of a leaky air valve;

Figure 2 is an enlarged view in longitudinal vertical section of the device embodied in Figure 1 and in the non-indicating position it occupies when not applied to a valve stem.

Referring specifically to the drawings, my invention, in its present embodiment, comprises a liquid containing body designated generally at B which in the present instance consists of a tube 10 of transparent material such as glass or celluloid, the tube having open ends which are received in and cemented as indicated at 11 or otherwise secured to cup-shaped heads 12 and 13 having axial ports 14 and 15 to provide, respectively, an inlet to and an outlet from the body. Inlet and outlet valves 16 and 17, respectively, preferably in the form of disks of rubber, are mounted, respectively, in the heads 12 and 13 and are normally urged by means of coil springs 18 to close the ends of the body B so as to confine a column of liquid therein.

As clearly shown in Figure 2, the valve 16 seats against the head 12 with its spring 18 in engagement with the lower end of the tube 10, so as to open inwardly of the body, while the valve 17 seats against the upper end of the tube 10 with its spring in engagement with the head 13 so as to open outwardly of the body. The valves are shouldered as indicated at 19 so as to provide centering projections which operate to prevent lateral displacement of the springs 18 from the valves. A short length of flexible rubber hose H by which the body B is adapted to be detachably secured to a valve stem is expanded at one of its ends over the head 12 and thus connected to the head in covering relation to its inlet opening 14.

In operation, and with the tube 10 filled with water or other suitable liquid, the body B is first supported by the operator in the upright position shown in Figure 1. The free end of the hose H is now expanded over the inlet end of the conventional valve stem V of a pneumatic tire T, it being understood that within the stem is mounted the usual air valve V' which when functioning properly prevents the escape of the air under pressure from within the tire tube T'. However, should the air valve V' function improperly to permit the escape of air, the escaping air will traverse the hose H as indicated by the arrows and pass through the inlet port 14 in the head 12 so as to act upon and open the inlet valve 16 against the tension of its spring 18. The air now travels upwardly through the tube 10 in the form of bubbles and acts upon the outlet valve 17 to open the latter, finally passing through the outlet port 15 to the atmosphere.

It will thus be clear that the presence of the leak in the air valve V' will be visibly indicated in the tube 10 by the bubbles of air passing upwardly therethrough. Conversely, should no air be escaping from the air valve V', the valves 16 and 17 will remain closed, and no bubbles of air will pass into the liquid in the tube 10, thus positively indicating that the air valve does not leak. After the test has been made the hose H is disconnected from the valve stem and the valves 16 and 17 operate to confine the column of liquid in the tube 10.

Should the device be inadvertently applied with the body B inverted to a valve stem having a leaky air valve the liquid in the tube 10 will necessarily be forced from the outlet port 15 by the escaping air and the tube thus drained. In such case the hose H is disconnected from the valve stem and filled with liquid after which it is again connected to the valve stem, the air escaping through the air valve then operating to force the liquid upwardly into the tube 10 to again fill the latter.

From the foregoing description it will be manifest that I have provided a simple and effective testing device by which a leak in the air valve of a pneumatic tire can readily be detected, the device being compact so that it can be readily carried about in a small compass, and capable of visibly indicating a leak regardless of how minute.

Although I have herein shown and described only one form of valve testing device embodying my invention, it is to be understood that various changes and modifications may be made therein without departing from the spirit of the invention and the spirit and scope of the appended claims.

I claim as my invention:

1. A testing device for tire valves comprising a tubular body formed of transparent material and having open ends, valves normally urged to close the ends of the body to thereby permit a column of liquid to be confined in the body, one of said valves opening inwardly of and the other outwardly of the body, and a flexible hose connected to the end of the body having the inwardly opening valve and adapted to be detachably secured to a valve stem.

2. A testing device for tire valves comprising a body having a transparent portion through which liquid in the body can be viewed, and provided with an inlet and an outlet oppositely disposed with respect to the inlet, and valves normally urged to close the inlet and outlet so as to confine a quantity of liquid in the body, the inlet valve opening inwardly of and the outlet valve outwardly of the body.

3. A testing device for tire valves comprising a body having a transparent portion through which liquid in the body can be viewed, and provided with an inlet and an outlet, and valves normally closing the inlet and outlet so as to confine a quantity of liquid in the body, said inlet valve opening inwardly and said outlet valve opening outwardly of the body and means by which the inlet of the latter is adapted to be connected to a tire valve stem, so that air escaping through the valve of the stem will act against said valves to open them, whereby the air will be free to pass into the body, through the liquid in the body in the form of bubbles, and then out of the body.

4. A testing device for tire valves comprising a body having a transparent portion through which liquid in the body can be viewed, the body being provided with an inlet and an outlet, and valves normally closing the inlet and outlet so as to confine a quantity of liquid in the body, the inlet valve opening inwardly of the body and the outlet valve opening outwardly of the body.

CARL JOHNSON.